(12) United States Patent
Bryant et al.

(10) Patent No.: US 7,885,179 B1
(45) Date of Patent: *Feb. 8, 2011

(54) METHOD AND APPARATUS FOR CONSTRUCTING A REPAIR PATH AROUND A NON-AVAILABLE COMPONENT IN A DATA COMMUNICATIONS NETWORK

(75) Inventors: Stewart Frederick Bryant, Green Park Reading (GB); Ian Michael Charles Shand, Cobham (GB); John Harper, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 11/393,166

(22) Filed: Mar. 29, 2006

(51) Int. Cl.
  *G01R 31/08* (2006.01)
  *G06F 11/00* (2006.01)
  *H04L 12/28* (2006.01)
  *H04L 12/56* (2006.01)

(52) U.S. Cl. .................. 370/216; 370/217; 370/389; 370/392

(58) Field of Classification Search .......... 370/216, 370/217, 389, 390, 392
See application file for complete search history.

(56) References Cited

U.S. PATENT DOCUMENTS

| | | | |
|---|---|---|---|
| 6,018,576 A | | 1/2000 | Croslin |
| 6,032,194 A * | | 2/2000 | Gai et al. .................. 709/239 |
| 6,148,410 A | | 11/2000 | Baskey et al. |
| 6,697,325 B1 * | | 2/2004 | Cain .......... 370/217 |
| 6,744,727 B2 | | 6/2004 | Liu et al. |
| 6,944,131 B2 * | | 9/2005 | Beshai et al. ............ 370/238.1 |
| 6,987,727 B2 * | | 1/2006 | Fredette et al. ............ 370/225 |
| 6,990,068 B1 | | 1/2006 | Saleh et al. |
| 7,158,486 B2 | | 1/2007 | Rhodes |
| 7,177,295 B1 | | 2/2007 | Sholander et al. |
| 7,420,989 B2 | | 9/2008 | Liu et al. |
| 7,519,009 B2 | | 4/2009 | Fleischman |
| 2002/0093954 A1 * | | 7/2002 | Weil et al. .................. 370/389 |
| 2002/0112072 A1 | | 8/2002 | Jain |
| 2003/0007500 A1 | | 1/2003 | Rombeaut et al. |
| 2003/0063613 A1 | | 4/2003 | Carpini et al. |
| 2003/0117950 A1 | | 6/2003 | Huang |

(Continued)

OTHER PUBLICATIONS

Anonymous, "Link-state routing protocol," downloaded May 3, 2007, pp. 1-5, published online by Wikipedia, US.

(Continued)

*Primary Examiner*—Chi H Pham
*Assistant Examiner*—Farah Faroul
(74) *Attorney, Agent, or Firm*—Hickman Palermo Truong & Becker LLP

(57) ABSTRACT

A method of constructing a repair path around a non-available component in a data communications network is described. The data communications network has, as components, nodes and links therebetween defining a network topology. The non-available component is a member of a shared risk group of components commonly renderable non-available. The method comprises the step, performed at a repairing node, of identifying as a repair target a neighbour component of the non-available component. The method further comprises the step of constructing a repair network topology omitting the shared risk group. The method further comprises the step of constructing a repair path to the repair target in the repair topology.

31 Claims, 17 Drawing Sheets

U.S. PATENT DOCUMENTS

| | | | |
|---|---|---|---|
| 2003/0233595 | A1* | 12/2003 | Charny et al. .................. 714/4 |
| 2004/0205239 | A1* | 10/2004 | Doshi et al. ................. 709/241 |
| 2005/0007950 | A1* | 1/2005 | Liu ............................. 370/221 |
| 2005/0013241 | A1 | 1/2005 | Beller et al. |
| 2005/0047353 | A1 | 3/2005 | Hares |
| 2005/0068968 | A1 | 3/2005 | Ovadia et al. |
| 2005/0201273 | A1 | 9/2005 | Shimizu |
| 2005/0265228 | A1 | 12/2005 | Fredette et al. |
| 2006/0013125 | A1 | 1/2006 | Vasseur et al. |
| 2006/0031482 | A1 | 2/2006 | Mohan et al. |
| 2006/0050630 | A1 | 3/2006 | Kobayashi et al. |
| 2006/0092941 | A1 | 5/2006 | Kusama |
| 2006/0140190 | A1* | 6/2006 | Lee ........................ 370/395.3 |
| 2006/0193252 | A1 | 8/2006 | Naseh et al. |
| 2006/0291446 | A1 | 12/2006 | Caldwell et al. |
| 2007/0005784 | A1 | 1/2007 | Hares et al. |
| 2007/0011351 | A1 | 1/2007 | Bruno et al. |
| 2007/0091793 | A1 | 4/2007 | Filsfils et al. |
| 2007/0091794 | A1 | 4/2007 | Filsfils et al. |
| 2007/0091795 | A1 | 4/2007 | Bonaventure et al. |
| 2007/0248016 | A1 | 10/2007 | Smith et al. |
| 2008/0025203 | A1 | 1/2008 | Tallet |
| 2008/0062986 | A1 | 3/2008 | Shand et al. |
| 2008/0089227 | A1 | 4/2008 | Guichard et al. |
| 2008/0192627 | A1 | 8/2008 | Lichtwald |
| 2008/0219153 | A1 | 9/2008 | Shand et al. |
| 2008/0317055 | A1* | 12/2008 | Zetterlund et al. .......... 370/401 |
| 2009/0129771 | A1* | 5/2009 | Saniee et al. ................... 398/3 |

OTHER PUBLICATIONS

E. Rosen et al., "Multiprotocol Label Switching Architecture," IETF RFC 3031, pp. 1-57, published by the Internet Society, Jan. 2001.

S. Bryant et al., "IP Fast Reroute Using Not-via Addresses," IETF Internet-Draft draft-bryant-shand-IPFRR-notvia-addresses-01.txt, pp. 1-21, published by the Internet Society, Oct. 2005.

State Intellectual Property Office of the People's Republic of China, "The First Office Action", filing No. 200680001652.0, May 8, 2009, 15 pages.

Claims, filing No. 200680001652.0, 4 pages.

European Patent Office, "Supplementary European Search Report", application No. EP 06720965, dated Jul. 21, 2009, 6 pages.

Claims, application No. EP 06720965, 4 pages.

U.S. Appl. No. 11/064,275, filed Feb. 22, 2005, Notice of Allowance, Mailing Date Jul. 27, 2010.

U.S. Appl. No. 11/175,805, filed Jul. 5, 2005, Notice of Allowance, Mailing Date Aug. 6, 2010.

Chinese $2^{nd}$ Office Action Chinese application No. 200680001652.0 dated Oct. 27, 2010 including current claims (13 pages).

* cited by examiner

*Fig. 4*
(Prior Art)

| DESTINATION ADDRESS 500 | NEXT_HOP 502 | REPAIR ADDRESS 504 | REPAIR NEXT_HOP 506 |
|---|---|---|---|
| B | P | B $\bar{p}$ | Z |
| D | P | B $\bar{p}$ | Z |
| A | P | A $\bar{p}$ | $\Omega_1$ |
| C $\bar{p}$ | Y | --- | |

| DESTINATION ADDRESS 910 | NEXT HOP 912 | REPAIR ADDRESS 914 | REPAIR NEXT HOP 916 |
|---|---|---|---|
| X | B | B NOT VIA A | C |
| P NOT VIA S | C | | |

FIG. 9B

METHOD AND APPARATUS FOR CONSTRUCTING A REPAIR PATH AROUND A NON-AVAILABLE COMPONENT IN A DATA COMMUNICATIONS NETWORK

FIELD OF THE INVENTION

The present invention generally relates to data communications networks. The invention relates more specifically to constructing a repair path around a non-available component in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet to the next node along that route. The next node repeats this step and so forth.

It will be noted that in normal forwarding each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated that induces creating a loop in the RIB or FIB. As an example, if node A sends a packet to node Z via node B, comprising the optimum route according to its SPF, a situation can arise where node B, according to its SPF determines that the best route to node Z is via node A and sends the packet back. This can continue for as long as the loop remains although usually the packet will have a maximum hop count after which it will be discarded. Such a loop can be a direct loop between two nodes or an indirect loop around a circuit of nodes.

One solution that has been proposed to the looping problem is described in co-pending patent application Ser. No. 11/064,275, filed Feb. 22, 2005, entitled "Method and Apparatus for Constructing a Repair Path Around a Non-Available Component in a Data Communications Network" of Michael Shand et al, ("Shand et al"), the entire contents of which are incorporated by reference for all purposes as is fully set forth herein and discussed in more detail below.

According to the solution in Shand et al a method for constructing a repair path can be understood with reference to FIG. 1 which depicts an illustrative network diagram to which the method is applied. The network includes a primary node P, reference numeral 200, a source node S, and nodes, A, B and C, reference numerals 202, 204, 206, 208 each connected to node P via respective links 210, 212, 214, 216. A further node D, reference numeral 218 is connected to node B via link 220. In addition to the standard addresses assigned to each node, each interface in the network is assigned an additional repair address. This is termed here the "notvia address" although it will be appreciated that this term is arbitrary, descriptive and non-limiting. The semantics of a notvia address are that a packet addressed to a notvia address must be delivered to the router with that address, notvia the neighboring router on the interface to which that address is assigned.

For example the interfaces from node P to nodes S, A, B, C by respective links 210, 212, 214, 216, may have addresses $P\bar{a}$, $P\bar{b}$, $P\bar{c}$ and $P\bar{s}$. Similarly the interfaces from nodes A, B, C and S to node P via links 212, 214, 216, 210 respectively in the opposite direction have addresses $A\bar{p}$, $B\bar{p}$, $C\bar{p}$, $S\bar{p}$.

To repair a failure, a repairing node, for example node S, encapsulates the packet to the notvia address of the node interface on the far side of the failure. The nodes on the repair path then know to which node they must deliver the packet, and which network component they must avoid.

Referring to FIG. 1, assuming that S has a packet for some destination D that it would normally send via P and B, and that S suspects that P has failed, S encapsulates the packet to $B\bar{p}$. The path from S to $B\bar{p}$ is, according to the semantic the shortest path from S to B not going via P. If the network contains a path from S to B that does not transit router P, then the packet will be successfully delivered to B. For example the packet may be forwarded along path 222 to node X, 224, and then path 226 to node D. Because node X has calculated a repair path for $B\bar{p}$ it will forward the encapsulated packet correctly. When the packet addressed to $B\bar{p}$ arrives at B, B removes the encapsulation and forwards the repaired packet towards its final destination, node D.

This can be further understood with reference to FIG. 2 which is a flow diagram illustrating at a high level the method applied herein. In block 300 node P advertises, using a notification such as an LSP, its adjacencies A, B, C, S and its associated notvia addresses $P\bar{a}$, $P\bar{b}$, $P\bar{c}$, $P\bar{s}$. It will be appreciated that all other nodes, acting as notifying node will also issue similar LSPs. As a result not only can appropriate forwarding tables be constructed, but also notvia addresses are available for each node in the event that it fails or otherwise becomes a non-available node, in which case the notvia address can be used as the repair address. Accordingly, in block 302, all participating nodes compute their next hops not only for each normal (non-failed) address but also for each notvia address. As a result each node constructs a repair path around each other node in the network and stores it against the corresponding notvia address.

In the event that node P subsequently fails or otherwise becomes unavailable, in block 304, then in block 306 the neighbour nodes detect or are notified of the failure in any appropriate manner. Where a neighbour node subsequently receives a packet which it would have sent to the failed component as its next hop then, acting as a repairing node, it identifies a repair end point or target to which it must tunnel such a packet to reach its subsequent destination in block 308. In the example given above, the repairing node is node S, and repair end point is node B for a packet with destination D. In particular this is identified by the respective notvia address B $\bar{p}$. As a result the node S tunnels the packet along the repair path to B$\bar{p}$ in block 310. In block 312 each next hop forwards the encapsulated packet towards the notvia address B$\bar{p}$, for example node X in FIG. 1 forwards the packet correctly. Because all of the participating nodes have calculated a path to the notvia address using the same repair topology, a packet is forwarded using normal IP forwarding without the requirement for extensions to the forwarding code. In block 314 the packet arrives at the repair end point which decapsulates it and forwards the original packet towards its destination, again using normal IP forwarding for destination D in the example described.

Referring once again to FIG. 1, it will be seen that in order to allow each enabled node on the network to construct a repair topology for a failed network component (link or node) each node must advertise its notvia addresses as well as the other relevant information stored in its LSP. Referring to FIG. 3, which is a diagram showing schematically the information contained in an LSP issued by node P, it will be seen that in addition to advertisement of each neighbour and its associated metric (e.g. the cost associated with the respective link) further information is provided. For example where the neighbour information is provided in column 400 and the associated metric in column 402, in addition a notvia address for each neighbour is provided in column 404. The notvia address is associated with the respective neighbour such that the entry against neighbour A effectively designates P$\bar{a}$. As long as the semantic is recognized by nodes receiving the LSP then the notvia address itself can take the form of a standard IP address shown schematically here as a.a.a.a representing P $\bar{a}$ and so forth. It will be seen that, as every node in the network provides similar information, each node can derive repair paths for every notvia address on the network.

As a result, referring once again to the example described with reference to FIG. 1 in which node S encapsulates a packet destined for node D to P$\bar{b}$ in the event of failure of node P, every node more generally calculates the path it would use in the event of any possible node failure. Each node therefore fails every other router in the network, one at a time, and calculates its own best route to each of the neighbours of that node. In other words, again with reference to FIG. 1, some router X will consider each router in turn to be P, fail P, and then calculate its own route to each of the notvia IP addresses advertised by the neighbours of P. i.e. X calculates its route to S$\bar{p}$, A$\bar{p}$, B$\bar{p}$ and C$\bar{p}$, in each case, notvia P.

Accordingly, referring to FIG. 4 which is a diagram illustrating relevant parts of the forwarding table derived at node S, it will be seen that for each address (column 500) the next hop (column 502) is derived, a notvia address (column 504) is designated and a corresponding repair address (column 506) is also implemented. For example where the destination is node B and the next hop is calculated as node P then, in addition, the repair address B$\bar{p}$ to which the packet will be tunneled is stored together with the corresponding repair next hop. In this case this is the first hop along the path 222 from node S to node X in the example described above with reference to FIG. 1, indicated as node Z, reference numeral 228 along link 230 from node S. In the case of packets destined for node D, the normal next hop is node P and the repair address is B$\bar{p}$ as a result of which the repair next hop is once again node Z for packets encapsulated to B$\bar{p}$. In the case of node A as destination address, the next hop is node P and the repair address is A$\bar{p}$ providing some repair next hop $\Omega_1$ (not shown). The repair addresses in node S's forwarding table will always be to a neighbour's neighbour, ie the repair tunnel endpoint. However it will be seen that where the normal address in column 500 is a notvia address, for example C$\bar{p}$, then although a next hop is provided as node Y, reference numeral 232 along link 234 from node S, a repair address and repair next hop are not provided as described in more detail below. As a result, node S will forward a packet using normal forwarding to a notvia address, when it lies in another node's repair path, but will not instigate a repair tunneled to a notvia address when the incoming packet is already destined for a notvia address.

One network configuration addressed in Shand et al is that of shared risk link groups (SRLG). An SRLG is a set of links whose failure can be caused by a single action such as a conduit cut or line card failure. When repairing the failure of a link that is a member of an SRLG, it must be assumed that all the other links that are also members of the SRLG have also failed, that is to say, the members of the SRLG comprise a group of components commonly renderable non-available. Consequently, any repair path must be computed to avoid not just the adjacent link, but also all the links which are members of the same SRLG.

According to the solution in Shand et al a repair path is computed and installed to the far side of all elements of the SRLG, encapsulating a repair packet to the notvia address of the router or node which has the lowest cost route from the repairing node to the destination. FIG. 5 is a network diagram illustrating the treatment of an SRLG in Shand et al including nodes A, B, C, D reference numerals 520, 522, 524, 526 respectively connected sequentially by links 528, 530, 532. Links 528 and 532 joining nodes AB and CD respectively belong to an SRLG S1. According to Shand et al in order to repair a failure of link 528 joining nodes AB, all components in the common SRLG, that is link 532 joining nodes C and D as well, are treated as failed and a repair path is constructed from node A to node D in a repair topology omitting those links and using further links and nodes in the topology which are not shown in FIG. 5. As a result traffic destined for destinations reachable via node D would be repaired to node D "notvia SRLG S1". Traffic that needs to go to node B for example because some destinations such as node C are only reachable via node D are repaired to node B "notvia SRLG S1". However it is found that this approach is unnecessarily conservative and results in an overly complex calculation; and in some cases repair destinations that are in fact available may be unreachable.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a diagram illustrating a forwarding table constructed at a neigbour node to a non-available node according to Shand et al;

FIG. 9B is a diagram illustrating a forwarding table constructed at a non-neigbour node to a non-available node according to the present approach;

DETAILED DESCRIPTION OF THE PREFERRED EMBODIMENT

A method and apparatus for constructing a repair path around a non-available component in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Repair Path
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method of constructing a repair path around a non-available component in a data communications network having, as components, nodes having a network address and links there between, defining a network topology. The non-available component is a member of a shared risk group of components commonly renderable non-available. The method comprises the step performed at a repairing node of identifying as a repair target a neigbour component of the non-available component. The method further comprises the step of constructing a repair network topology omitting the shared risk group. The method further comprises the step of constructing a repair path to the repair target in the repair topology.

In other aspects, the invention encompasses a computer apparatus and a computer-readable medium configured to carry out the foregoing steps.

2.0 Structural and Functional Overview

Figure 1:
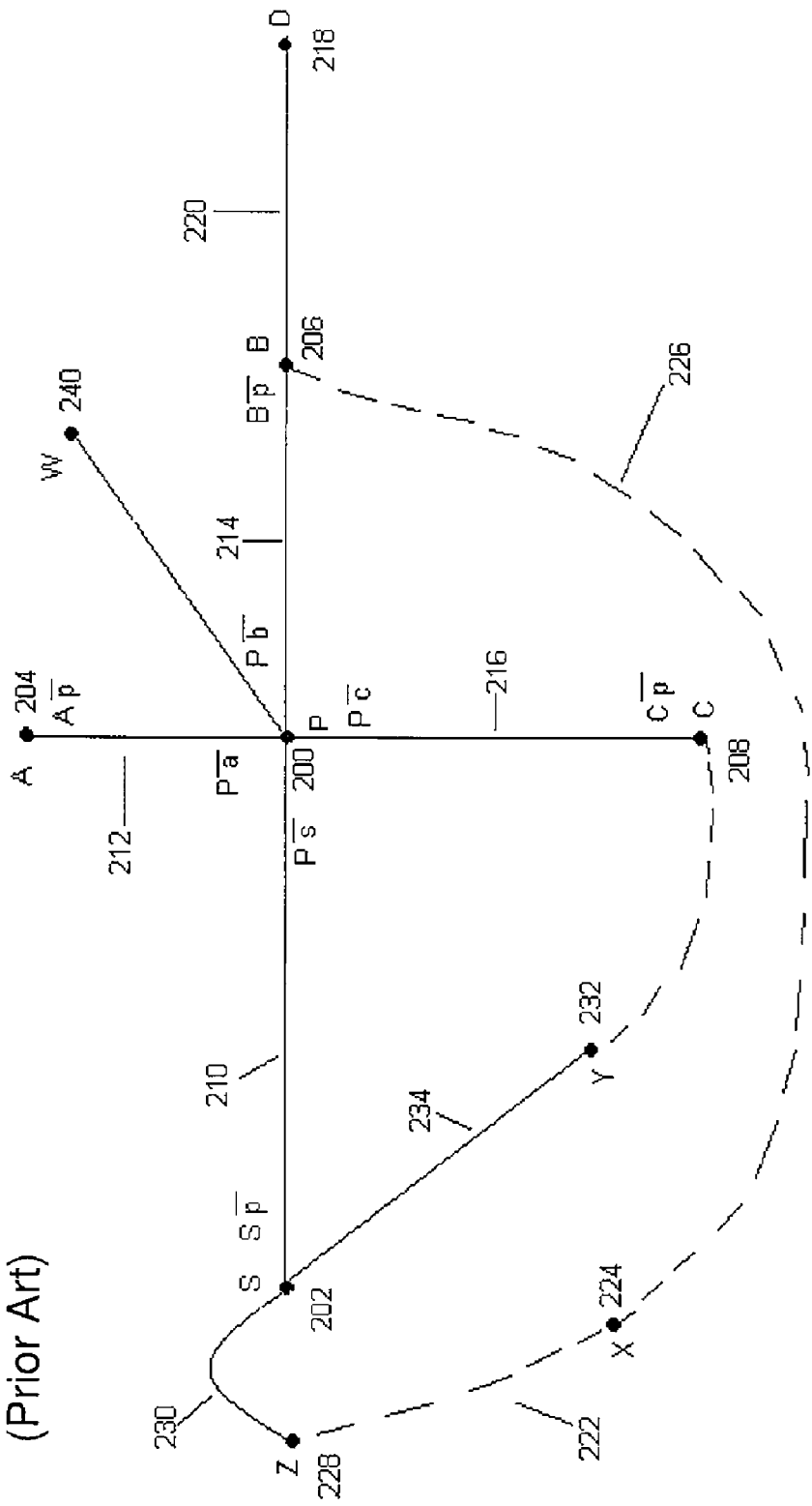
FIG. 1 is a representation of a network illustrating a method of constructing a repair path according to Shand et al.
Figure 2:
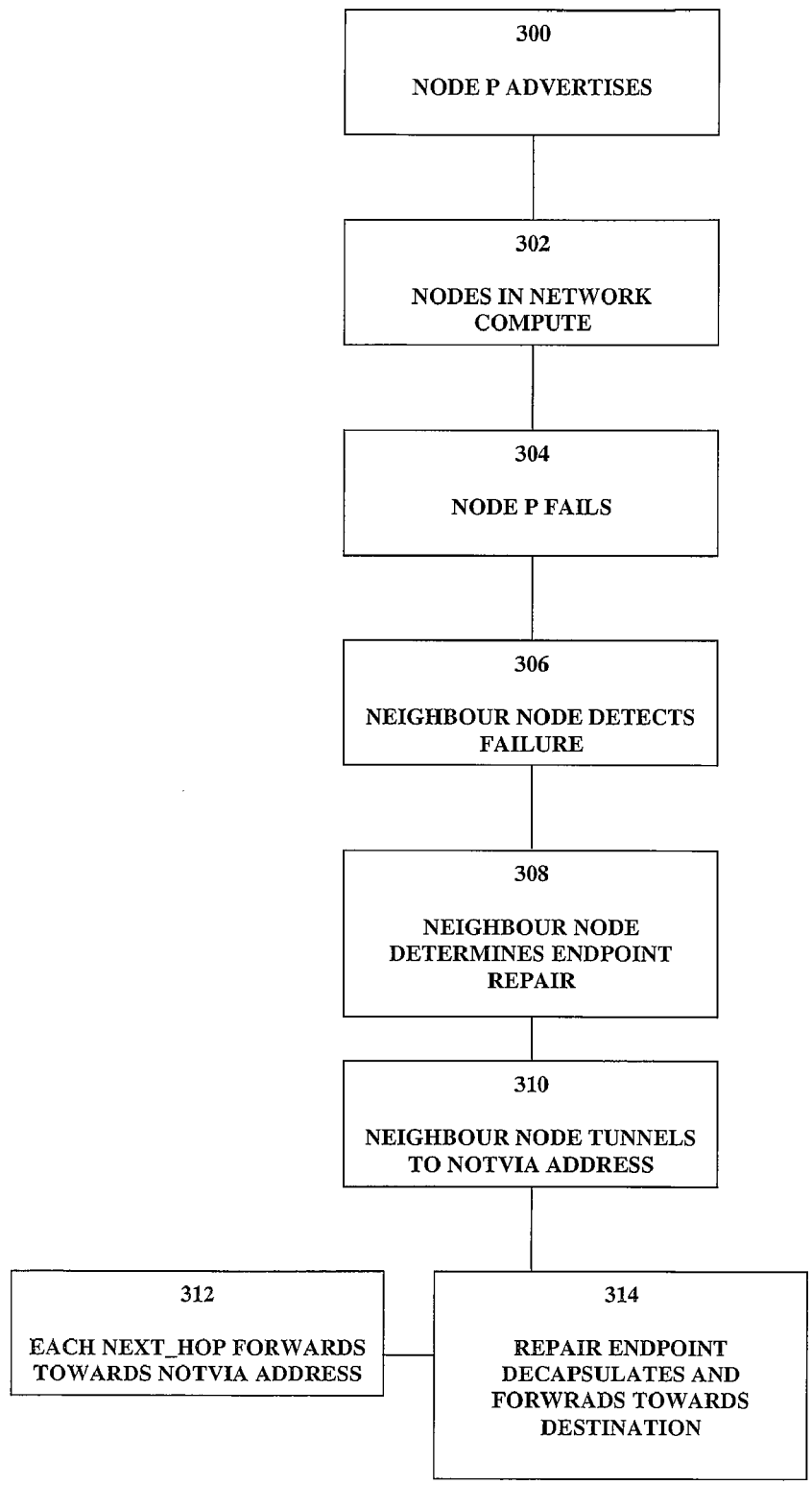
FIG. 2 is a flow diagram illustrating a method of constructing a repair path according to Shand et al.
Figure 3:
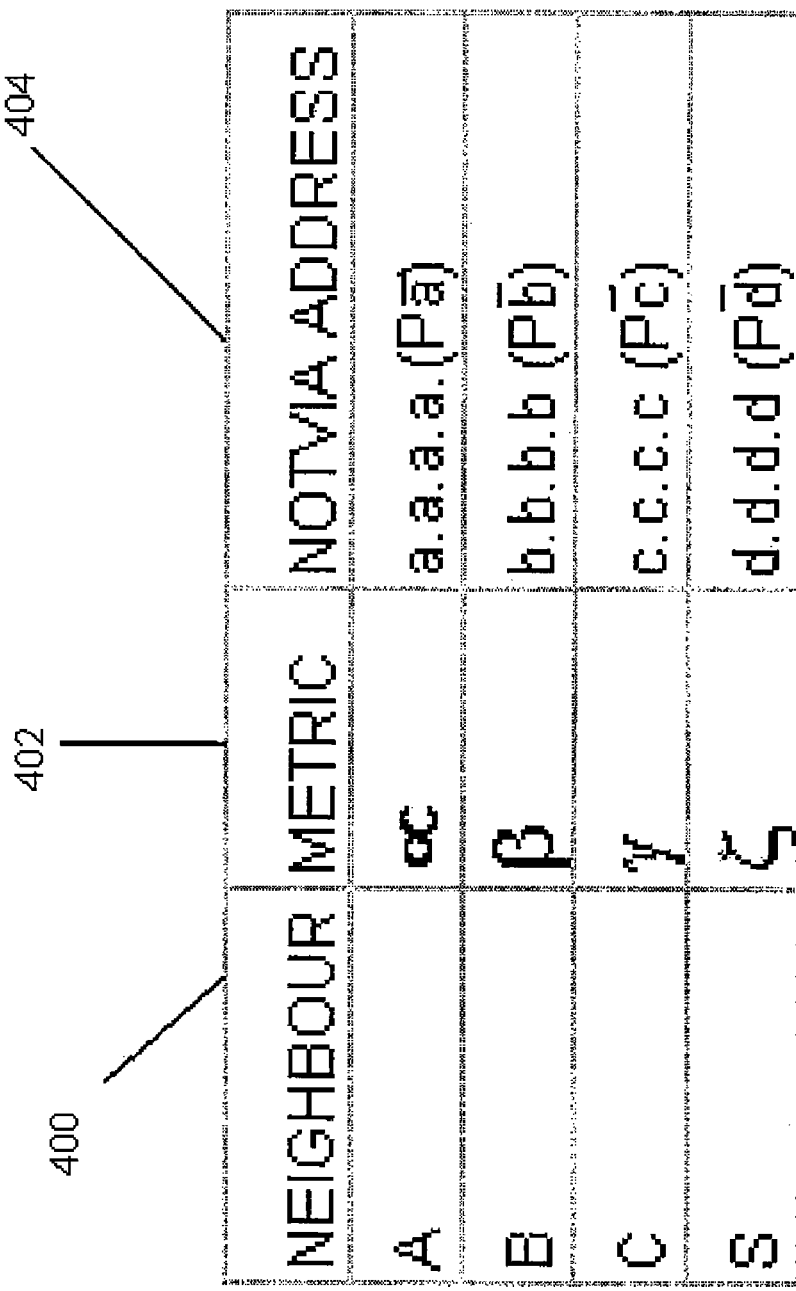
FIG. 3 is a schematic representation of information carried in an LSP according to Shand et al.
Figure 5:
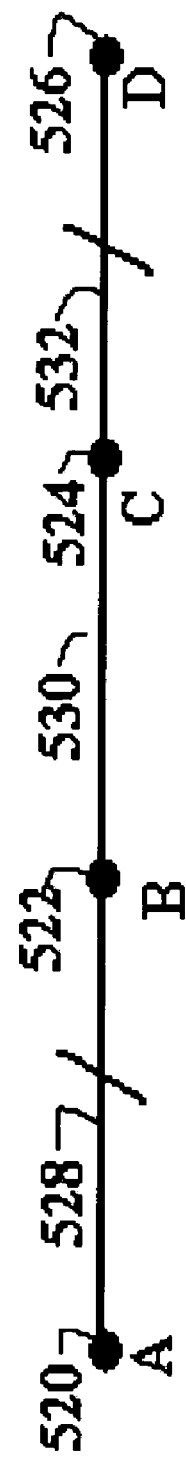
FIG. 5 is a representation illustrating a method of constructing a repair path around an SRLG according to Shand et al.

In overview a method according to the present approach for constructing a repair path can be understood with further reference to FIG. 5. In particular according to the present approach all traffic that needs to go via node B is sent via node B even if it would, subsequently, have proceeded via node D. Any such traffic subsequently that needs to proceed via node D is repaired by node C in due course. Similarly, if node B itself has failed then node A repairs to node B's neigbours rather than to node B.

Figure 6:
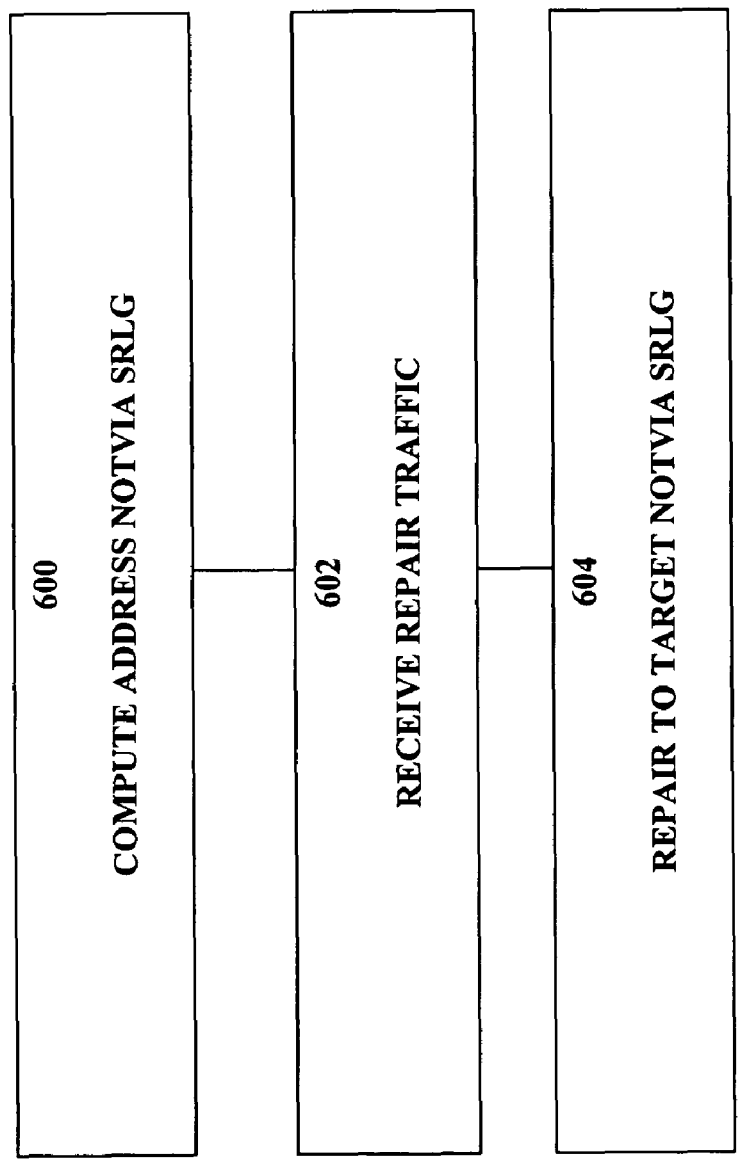
FIG. 6 is a flow diagram illustrating a method of constructing a repair path around an SRLG according to the present approach.

Referring to FIG. 6 which is a flow diagram illustrating at a high level the method applied herein, each node in the network computes its nexthops for each other node notvia SRLG S1 address based on a repair network topology omitting the entire SRLG. At step 602 when a repairing node such as node A identifies that the link joining nodes A and B has failed and is hence a non-available component it sends data traffic for a destination reachable via the non-available component via the repair path. In particular, at step 604 the repairing node sends traffic towards node B as repair target comprising a neigbour component of the non-available component, encapsulating the traffic to node B's notvia SRLG S1 address. As each other node in the network has computed this notvia address they will forward the encapsulated traffic towards node B on the repair topology. As all nodes in the repair path have computed the notvia SRLG S1 address as though the entire SRLG has failed looping will not take place. This can be contrasted with a situation in which nodes in a repair path had only computed a repair topology failing the link joining nodes AB and none of the other links in the SRLG. In that case, if a node in the repair path encountered failure of a link to its nexthop which was in fact a result of the failure of the SRLG it would attempt to repair around the failed link. However, as discussed above, according to Shand et al it would in fact drop the traffic as it is impermissible to repair already repaired traffic.

As a result of the approach described, repair in the SRLGs is carried out one step at a time instead of trying to repair to the far side of an SRLG as a result of which repair is simplified because each repairing node only needs to compute a repair path to a target which is a neigbour component of the non-available component rather than additional repair targets at the far end of the entire SRLG.

As described in more detail below, further optimizations are discussed. For example where a non-available component comprises a number of multiple SRLGs then the repair network topology is computed as though all of the SRLG's have failed. In addition the approach can be implemented in the case of both link failure and node failure which can be treated as a special case of an SRLG in which case a diagnostic step can be implemented to identify which failure type has taken place.

3.0 Method of Constructing a Repair Path

The links S-P 706 and A-B 712 are both members of SRLG "a". The semantics of the not-via address Ps changes from simply "P not-via the link S-P" to be "P not-via the link S-P or any other link with which S-P shares an SRLG" In FIG. 7 this is the links that are members of SRLG "a". I.e. links S-P and A-B. Since the information about SRLG membership of all links is available in the Link State Database, all nodes computing route to the not-via address Ps can infer these semantics, and perform the computation by failing all the links in the SRLG when running the SPF.

Note that it is not necessary for S to consider repairs to any other nodes attached to members of the SRLG (such as B). It is sufficient for S to repair to the other end of the adjacent link (P in this case).

Figure 7:
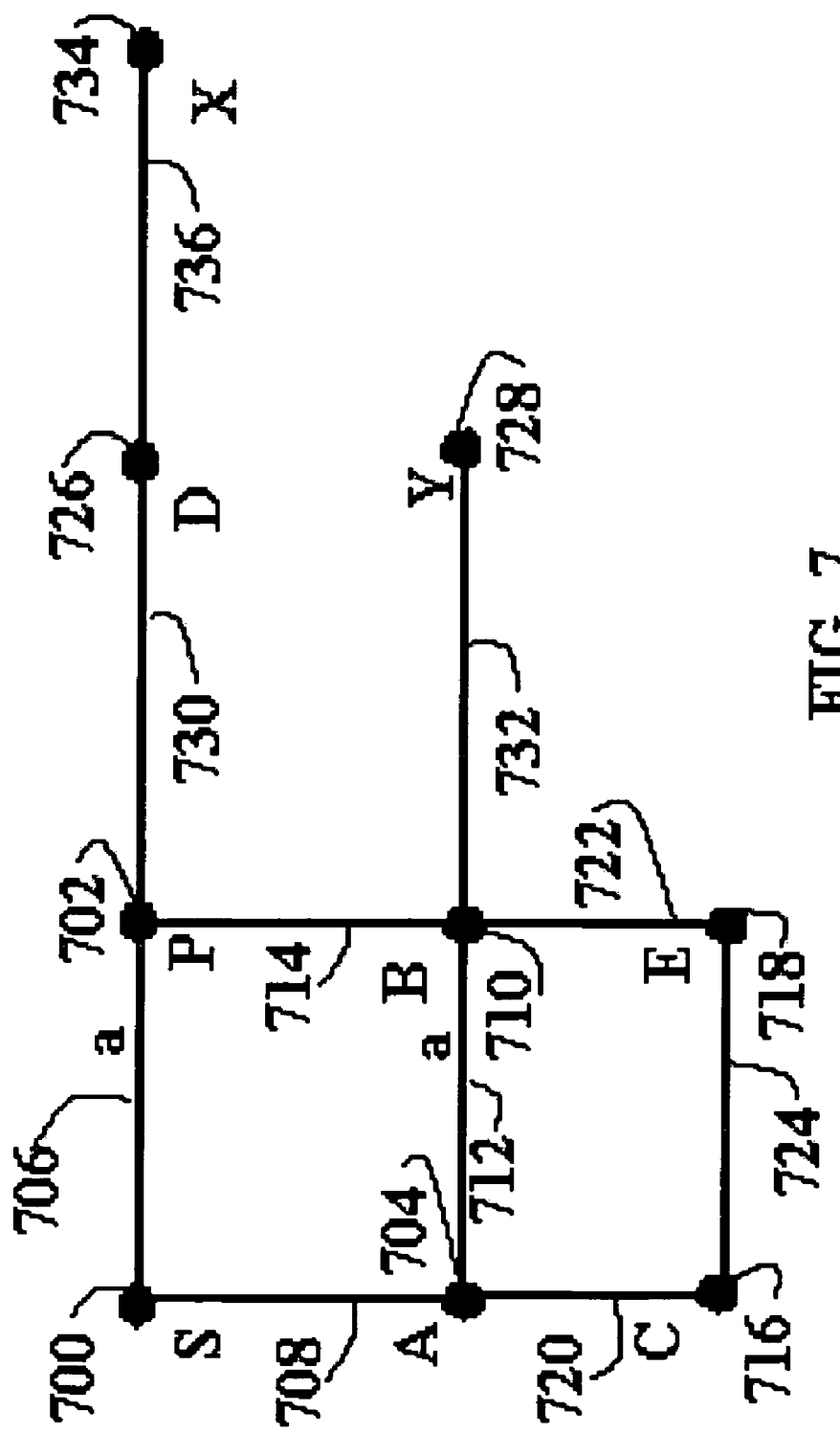
FIG. 7 is a representation of a network illustrating a method of constructing a repair path in an alternative topology according to the present approach.

Turning first to link failure, FIG. 7 shows network topology to which the approach may be applied. In particular the topology includes a repairing node S 700 which is connected to nodes P and A 702, 704 via respective links 706, 708. A node B, 710 is connected to nodes A and P by a respective link 712, 714 and nodes C and E, 716 and 718 are connected to nodes A and B via link 720, 722 respectively and to one another by a link 724. In addition a node D and a node Y 726, 728 are connected to nodes P and B respectively via links 730, 732 and a node X 734 is connected to node D via a link 736. Links 706 and 712 joining nodes SP and AB respectively are members of an SRLG a.

Figure 8A:
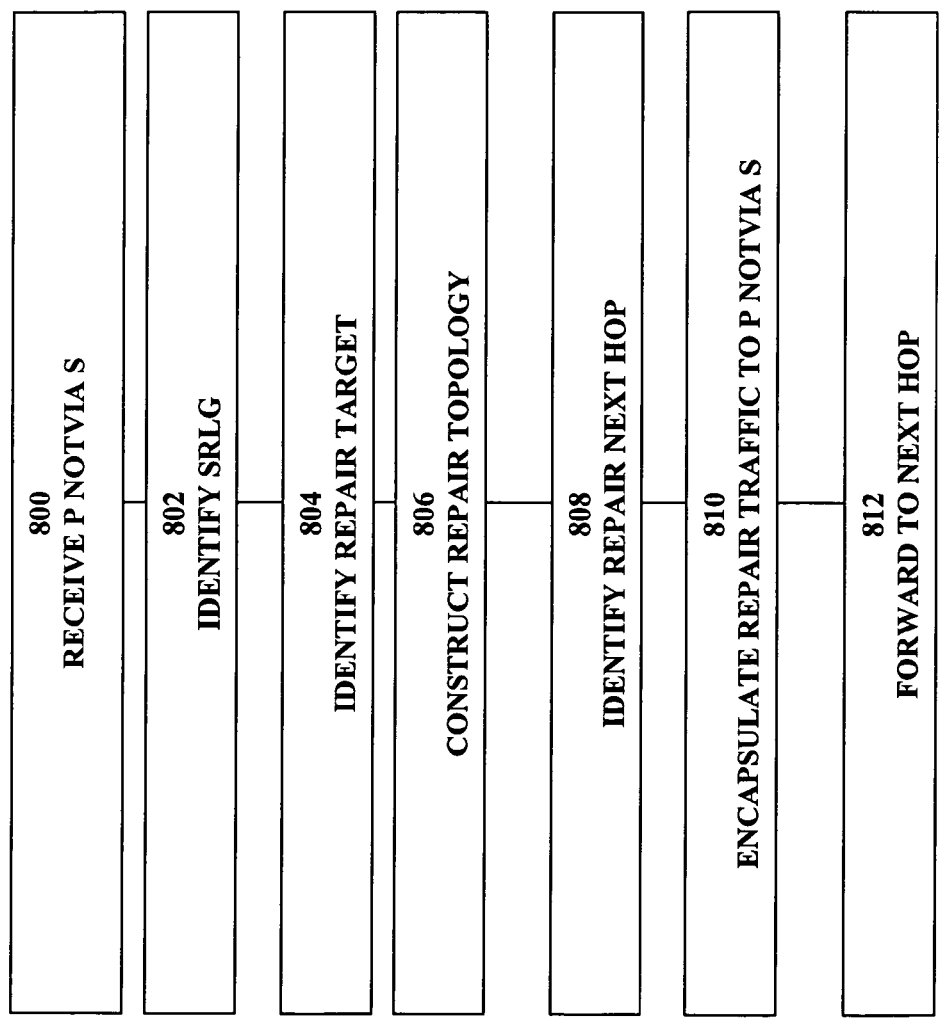
FIG. 8A is a flow diagram illustrating in more detail a method of constructing a repair path according to the present approach.
Figures 8B, 9A:
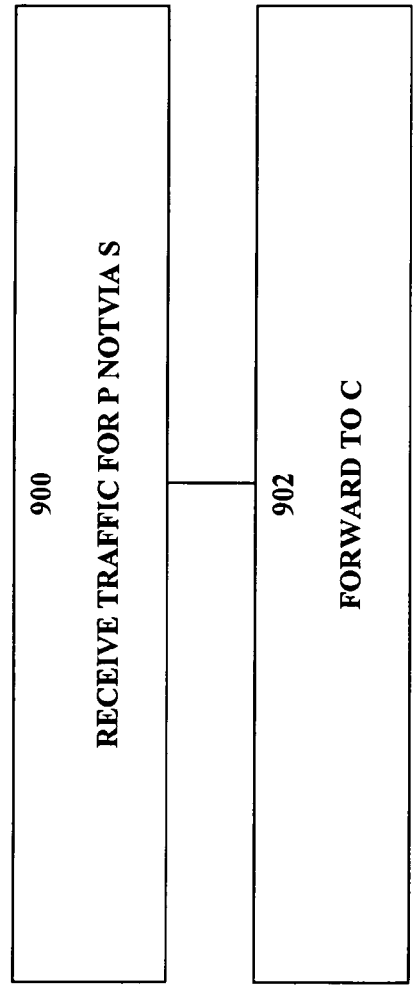
FIG. 8B is a diagram illustrating a forwarding table constructed at a neigbour node to a non-available node according to the present approach.
FIG. 9A is a flow diagram illustrating a method of constructing a repair path at a non-neigbour node to a non-available node according to the present approach.

The manner in which repair takes place at repairing node S can be further understood with reference to FIG. 8A which is a flow diagram illustrating the steps involved in computing a repair path and FIG. 8B which is a diagram showing a forwarding table computed at repairing node S. At step 800 node S receives P's notvia address "P notvia S" and at step 802 node S identifies that the link joining nodes S and P is a member of SRLGa for example based on a table listing SRLG's in the network. Alternatively node P may advertise its notvia address as "P notvia SRLGa". At step 804 node S identifies node P as the repair target and at step 806 node S constructs a repair topology in which all links in the common SRLGa are deemed failed, that is link 706 between nodes S and P and link 712 between nodes A and B. At step 808, therefore, node S identifies node A as its repair nexthop. At step 810 when incoming traffic is received at node S which requires repairing it is encapsulated to the address P notvia S and at step 812 the encapsulated traffic is forwarded to the relevant nexthop, node A. Referring to the forwarding table shown in FIG. 8B, for example, such repair traffic may be traffic destined for node X as indicated in column 840. According to normal forwarding the nexthop in column 842 for such traffic is node P. However if node S identifies that the link to node P has failed then instead it encapsulates to the repair address in column 844 P notvia S and forwards to the repair nexthop of node A in column 846.

FIG. 9A is a flow diagram illustrating the steps taken at node A upon receipt of an encapsulated packet for node P notvia S, and FIG. 9B shows the forwarding table maintained at A in that case. In particular at step 900 node A receives incoming traffic for node P notvia S and at step 902 node A forwards the traffic to node C where it is forwarded via nodes E and B to node P where the traffic is decapsulated and forwarded on according to the address in its inner header. This can further be seen from the forwarding table shown in FIG. 9B. According to normal forwarding if node A receives traffic for destination node X in column 910 and stores as nexthop node B in column 912, assuming this is the lowest cost route. In case node A would be acting a repairing node and it also stores node B's repair address B notvia A in column 914 and the corresponding nexthop of node C in column 916. However node A also stores in column 910 address P notvia S as destination address and corresponding nexthop of node C in column 912. It can be seen that if node A had computed its repair address for P notvia S treating only link 706 as failed but not link 712 to node B as failed, then it would have stored node B as its nexthop with P notvia S. If the SRLG had failed in that case then node A would detect that it had to repair around link AB and dropped the traffic as it cannot repair the traffic which is already destined for a notvia address.

Figure 10:
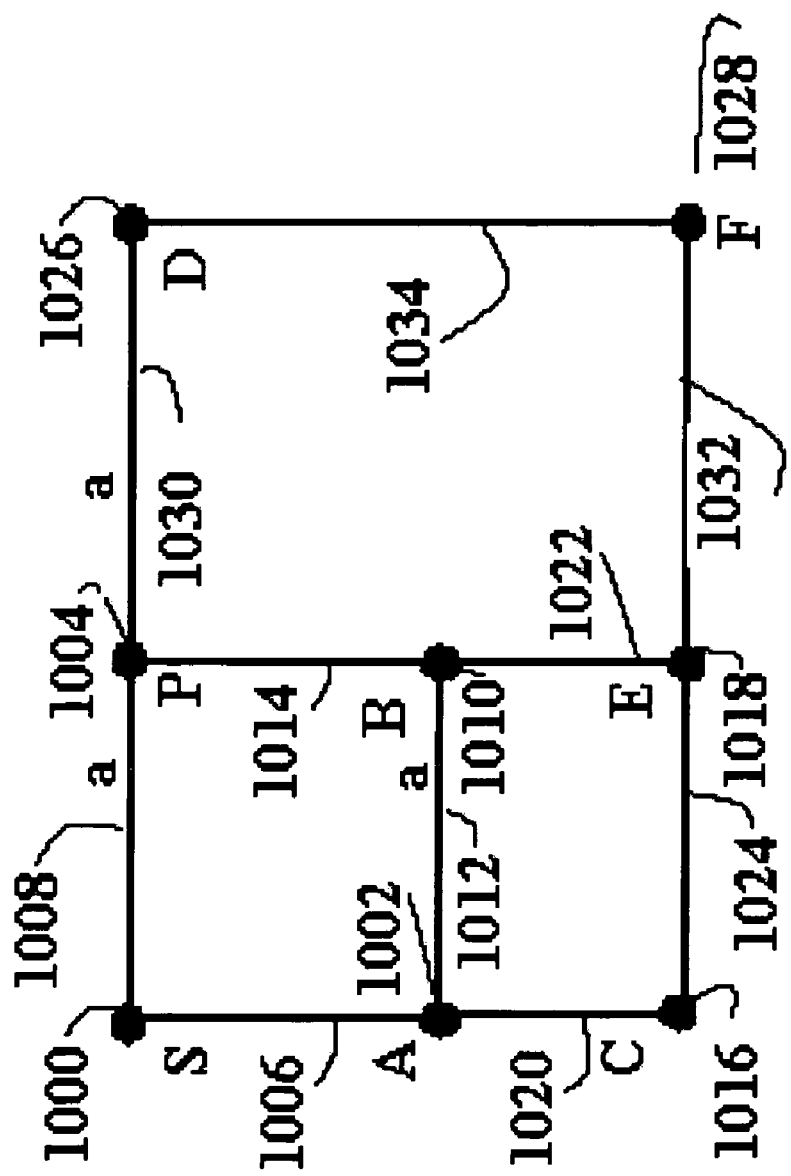
FIG. 10 is a representation of a network illustrating a method of constructing a repair path in relation to a further alternative network topology.

FIG. 10 shows an alternative network topology in which a node S 1000 is connected to nodes A and P, 1002, 1004 via respective links 1006, 1008. A node B 1010 is connected to nodes A and P via links 1012, 1014 respectively. Nodes C and E, 1016, 1018 are connected to nodes A and B via respective links 1020, 1022 and to one another by link 1024. Nodes D and F 1026, 1028 are connected to nodes P and E via respective links 1030, 1032 and to one another by link 1034. The links 1008, 1012 and 1030 joining nodes SP, AB and PD respectively belong to a common SRLG such that the links comprising the SRLG occur in series in the path from node S to node D. In this case multiple consecutive repairs are implemented in which node S first repairs to P notvia S and then node P repairs to D notvia P. In both cases the repair topology is computed omitting all members of SRLGa.

Figure 11:
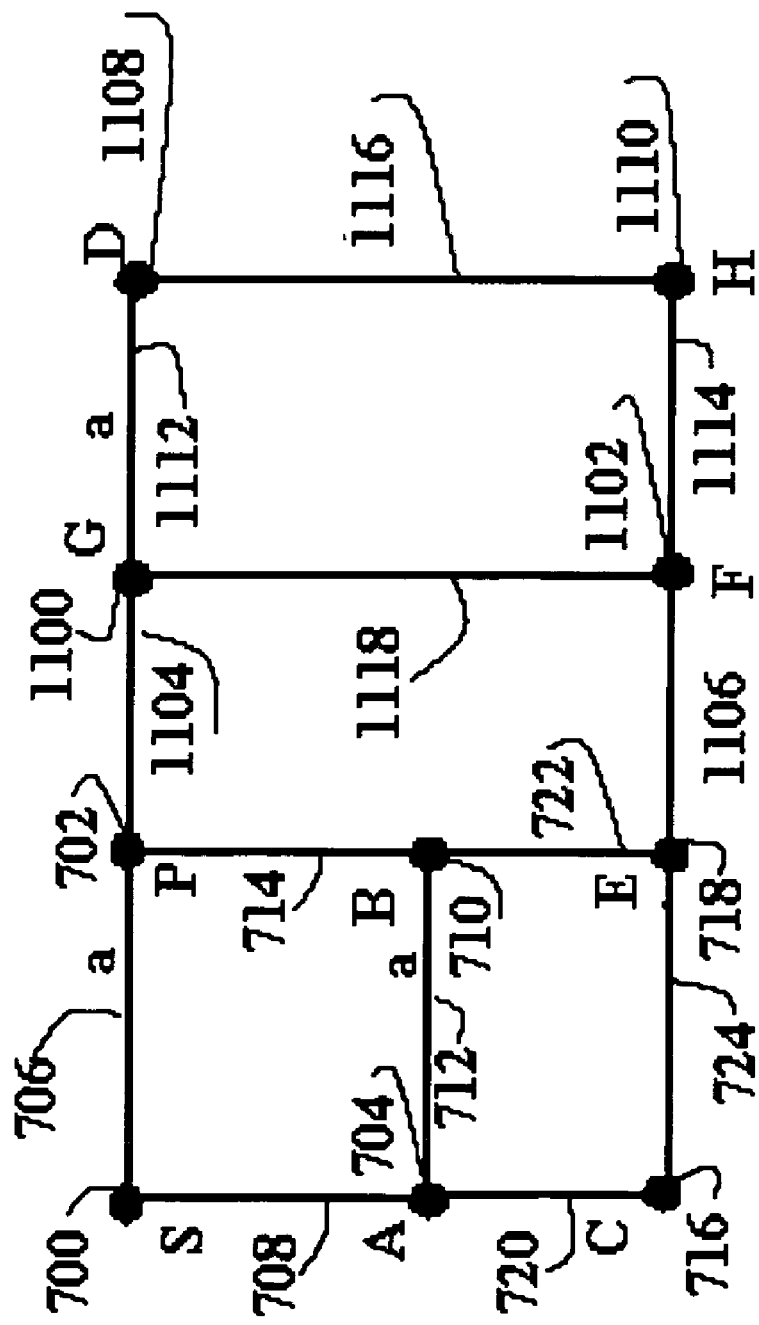
FIG. 11 is a representation of a network illustrating a method of constructing a repair path in relation to a further alternative network topology.

FIG. 11 is a network diagram showing a further alternative repair topology illustrating that although multiple repairs may be used only a single level of encapsulation is required. Nodes S, P, A, B, C, E are connected as discussed above with reference to FIG. 7 such that common numbering will be used. In addition nodes G and F, 1100, 1102, are connected respectively to nodes P and E via links 1104, 1106 and nodes D and H, 1108, 1110 are connected to nodes G and F via respective links 1112, 1114 and to one another via link 1116. Nodes G and F are connected by link 1118. The link 1112 joining node D and G is also a member of SRLGa. Accordingly when node S repairs to P notvia S by encapsulating to that address, the repair packet is decapsulated at node P before it is re-encapsulated using the notvia address D notvia G corresponding to the far side of the next link 1112 which is a member of the same SRLG. Referring to FIG. 10 it will be seen that de-capsulation and re-encapsulation take place (at least notionally) at a single node P while in the topology of FIG. 11 de-capsulation takes place at node P whereas re-encapsulation takes place at node G. In particular node P decapsulates the packet and forwards it "native" to node G using its normal FIB entry for destination D after which node G repairs the packet to D notvia G. It can be shown that such multiple repairs can never form a loop because each repair causes the packet to move closer to its destination.

Figure 12:
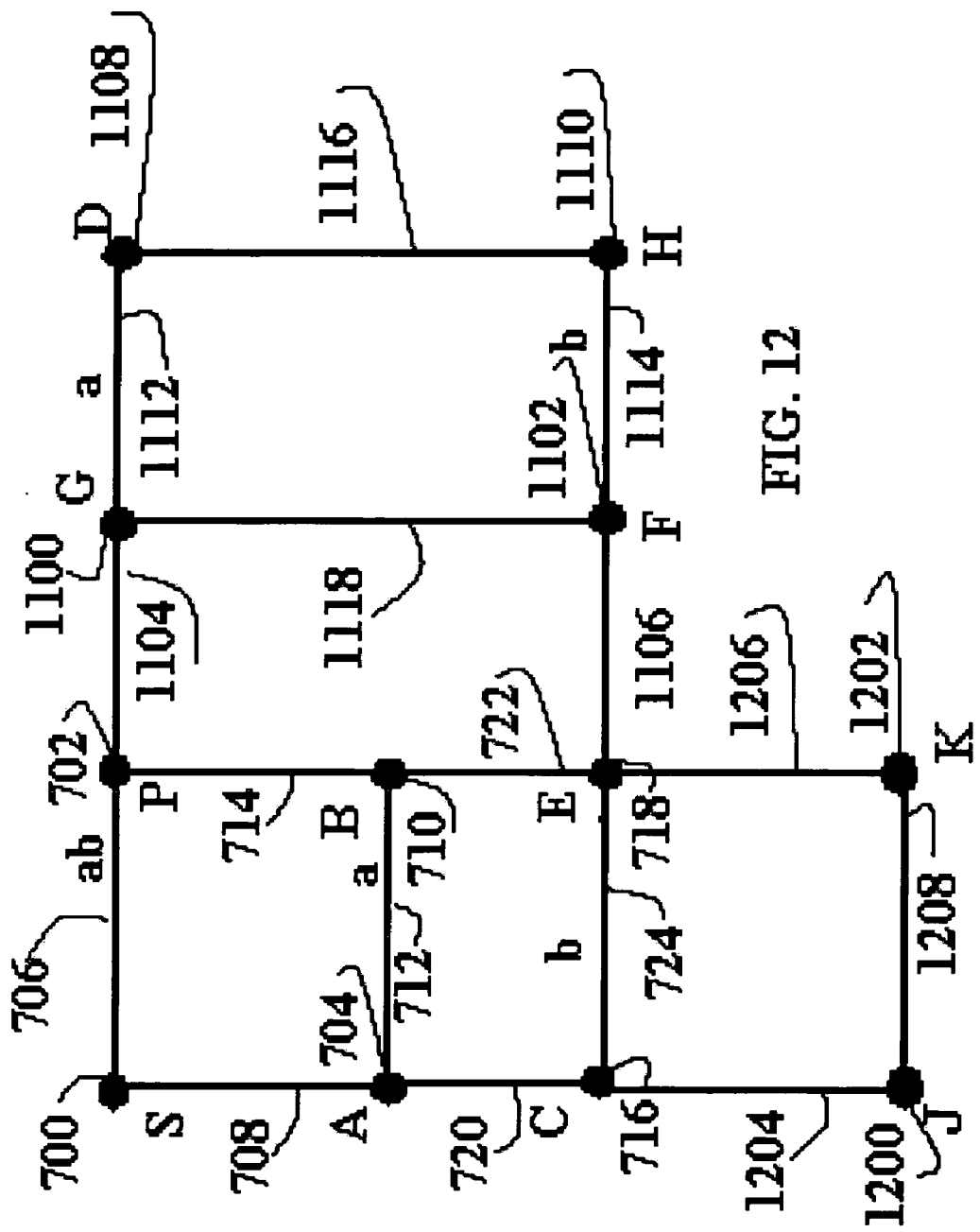
FIG. 12 is a representation of a network illustrating a method of constructing a repair path in relation to a further alternative network topology.
Figure 13:
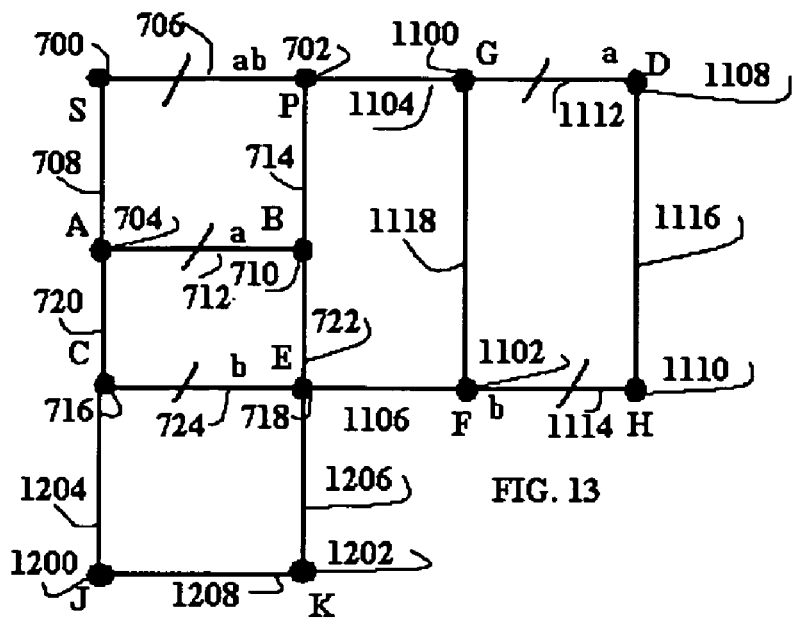
FIG. 13 is a representation of a network illustrating a method of constructing a repair path in relation to a further alternative network topology.

Reference is now made to FIGS. 12 and 13 of which show yet a further alternative network topology including multiple SRLGs. In both topologies nodes S, P, A, B, C, E are connected as described above with reference to FIG. 11 and commonly referenced. However link 706 joining nodes SP is a member of SRLG b as well as SRLG a and link 724 joining nodes C and E and link 1114 joining nodes F and H are also members of SRLG b. In addition nodes J and K, 1200, 1202 are connected to nodes C and E by respective links 1204, 1206 and to one another by link 1208.

Accordingly it can be seen that a single link, for example link 706, can be a member of multiple SRLG's and that those SRLG's may not be isomorphic. In that case, when a failure of the link is detected it must be assumed that both SRLG's a and b have failed. Hence the notvia path to P notvia S must be computed by failing all links which are members of SRLG a or SRLG b such that the semantic of P notvia S is "P notvia any links which are members of any of the SRLG's of which link SP is a member".

The topology with the relevant links failed is shown in FIG. 13. All other nodes compute their nexthop for the notvia address as though all of the SRLG's had also failed, by identifying the SRLG's of which the corresponding failed link is a member. In this case the repair path to P notvia S will be S—A—C—J—K—E—B—P. It will be noted that there is no path to D if both SRLG's a and b have in fact both failed but this would be an instance of multiple uncorrelated failures which is an unlikely scenario. As the packet has been decapsulated at P and G or F compute their link repair independently, therefore, unless both SRLG a and SRLG b have actually failed then D is reachable and traffic will not be dropped.

Figure 14:
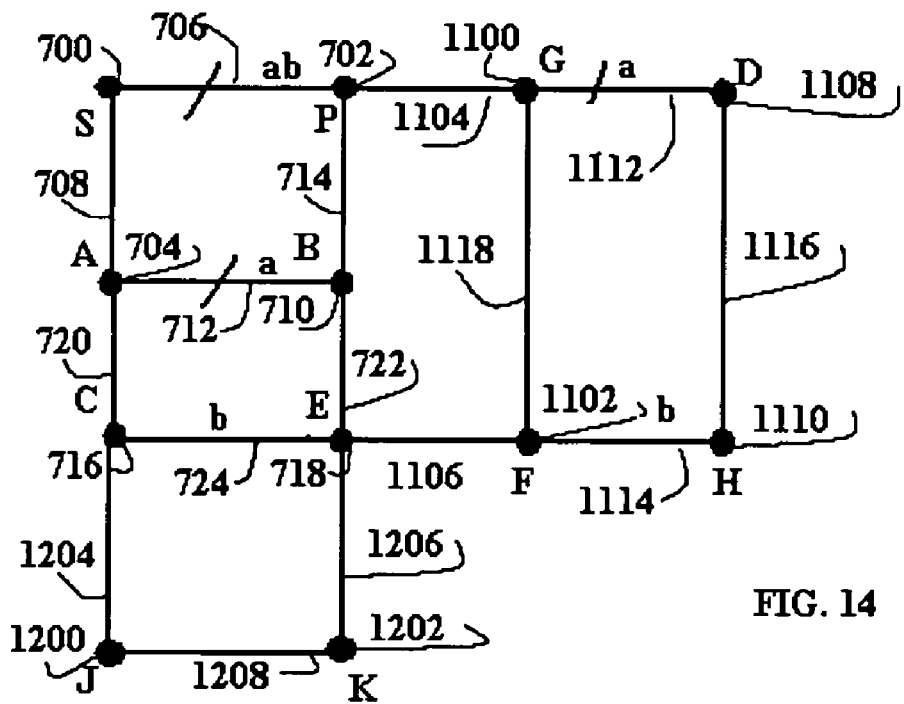
FIG. 14 is a representation of a network illustrating a method of constructing a repair path in relation to a further alternative network topology.

This can be seen from FIG. 14 which is a network diagram corresponding to the topology of FIGS. 12 and 13 in which SRLG a has failed but not SRLG b. In that case the "native" packet will arrive at node G and will be repaired around the path G—F—H—D. Conversely if only SRLG b has failed then G simply delivers the packet across the link GD in "native" form.

A repair strategy that assumes the worst-case failure for each link can often result in longer repair paths than necessary as can be seen from the scenario discussed above with reference to FIGS. 12 to 14. For example if only link 706 joining nodes S and P had failed then in fact the repair path could have been node S—A—B—P. If SRLG a had failed then the path could have been node S—A—C—E—B—P. As both SRLG's a and b were considered failed then instead the path is S—A—C—J—K—E—B—P. In cases where only a single link fails rather than the full SRLG, this strategy may occasionally fail to identify a repair even though a viable repair path exists in the network, for example if removal of all of the SRLG members partition the network. In that case it is possible to generate a report that the link in question is irreparable so that the network designer can take appropriate action such as modifying the design of the network to avoid the possibility. Alternatively bi-directional forwarding detection (BFD) can be carried out over alternate repair paths to determine which SRLG member has actually failed and this information used to select an appropriately pre-computed repair path.

One instance in which BFD can be particularly useful occurs in the case of node failure. As discussed above, SRLG's can be identified for example where a series of links occupy a common conduit such that physical damage to the conduit will damage all of the links. Another possibility, however, is where all of the links are connected to a common node line card in which case failure of the node or line card effectively disables all of the links such that they can also be treated as an SRLG.

Figure 15:
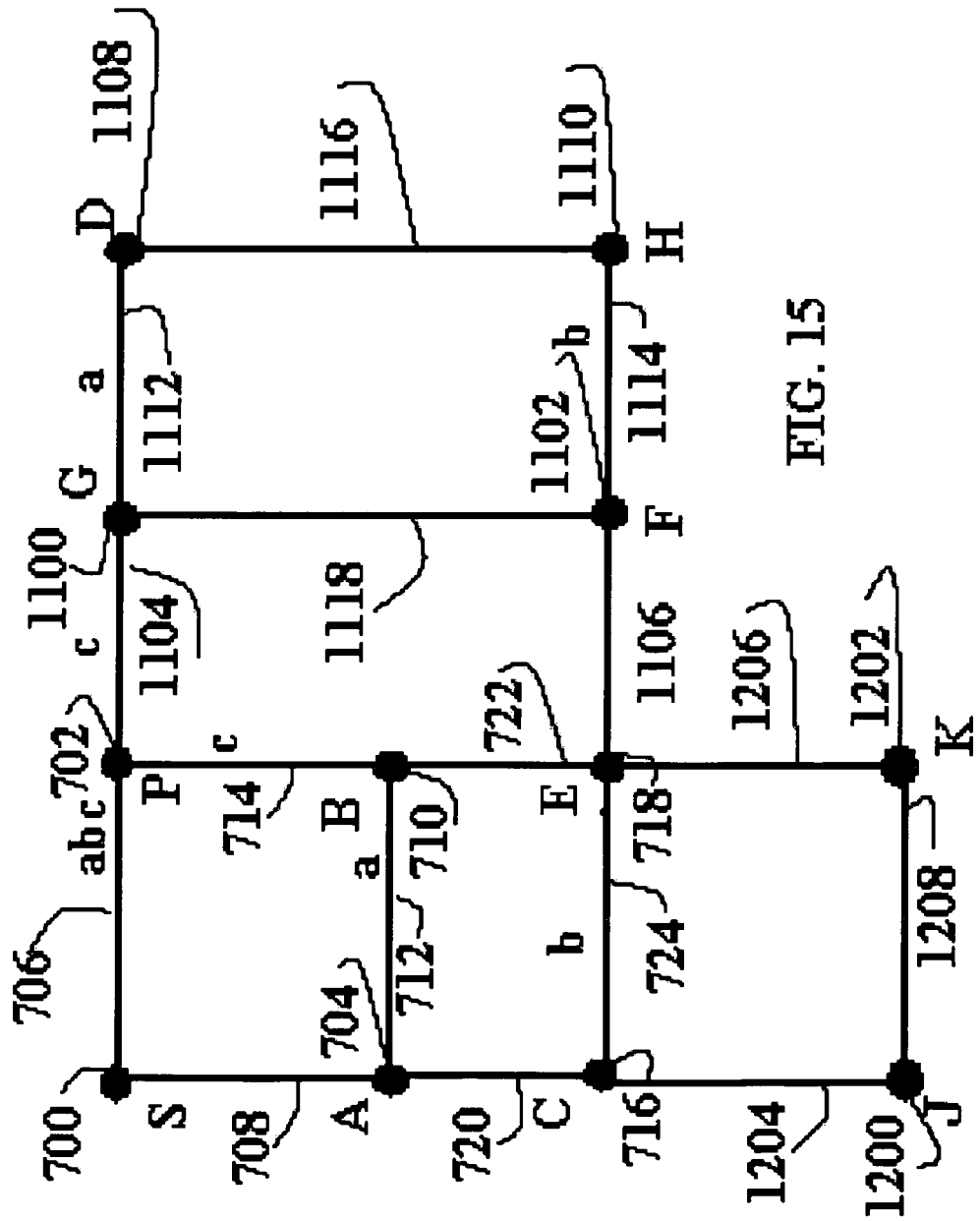
FIG. 15 is a representation of a network illustrating a method of constructing a repair path in relation to a further alternative network topology.

FIG. 15 is a network diagram showing a topology which node failure is treated as an SRLG failure. Nodes S, P, A, B, C, E, J, K, G, F, D and H show the same topology as described above with reference to FIGS. 12 to 14 except that the links common to node P, links 706, 730, 714 are treated as belonging to an SRLG c. In that case on failure of the link joining node S and P, S must repair around node P altogether to its neighbour node G using address G notvia P. As a result all of the links joining nodes S and P, P and G and P and B, i.e. SRLG c must be treated as failed. In addition if link SP also belongs to SRLG's a and b, then the links AB, CE, and FH must also be considered failed. In that case the repair path is S—A—C—J—K—E—F—G.

Figure 16:
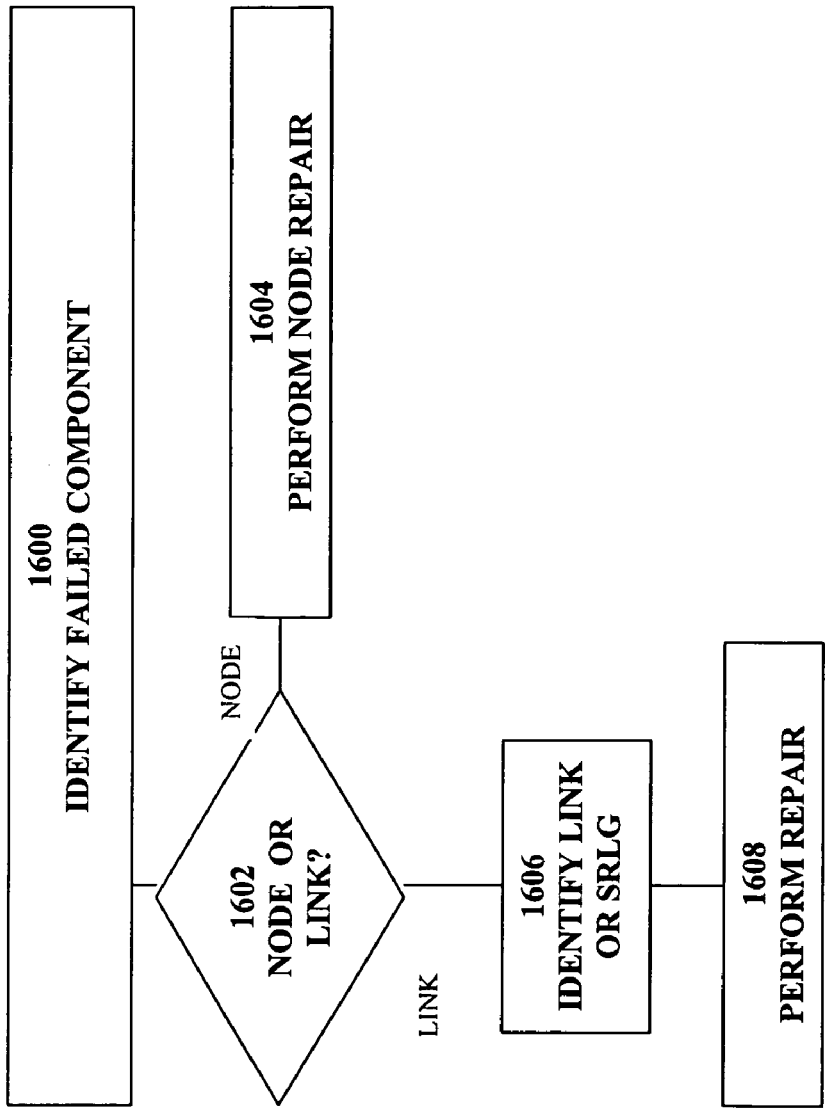
FIG. 16 is a flow diagram illustrating a method of identifying a failure type according to the present approach.

It can be seen that the repair path is now complex and as the number of possible failures increases, the risk of partitioning the network such that packets simply cannot reach some destinations similarly increases. Accordingly FIG. 16 is a flow diagram showing a diagnostic step which can be used to reduce the repair burden in some instances. At step 1600 the failed component is identified. At step 1602 if it is identified as a potential node failure then a node repair step using the precomputed path is carried out at 1604. If link failure is detected then at step 1606 the system checks using BFD whether the SRLG or just a link has failed. At step 1608 the appropriate repair is performed using the precomputed repair path. If the failure is an irreparable link such that certain destinations cannot be reached then an appropriate report will have been generated to the network designer. This approach can reduce the computing overhead in calculating a repair path and can remove the risk of some failures being deemed irreparable. In practice the text for node or link failure using BFD could be performed simultaneously.

It would be seen that the processes described above can be optimized for example according to the methods described in Shand et al.

Various possibilities exist for reducing the computation overhead and in particular ensuring that each node does not have to calculate an entire SPF for the failure of each other possible node. Firstly, if a node can identify that it will not be in a repair path from another node to a repair address then it does not need to calculate its next hop for that repair address. It will be noted that packets tunneled to a repair address will only originate from nodes repairing around a failed component, i.e. on the other side of the failed component from the repair address. Accordingly this can be achieved by signaling from the repairing node to each other node in its repair path for a given repair address in which case each node receiving the signal will calculate its own next hop for that repair address. Alternatively some form of "discovered" signaling route can be built up. For example where node S sends a packet to its repair next hop (for example node X), if that repair next hop has not constructed a repair path it will drop the packet but then calculate its own repair next hop. If S, under the control of a higher level protocol, resends the packet when no acknowledgement is received from the final destination, node X will now forward the packet to its repair next hop which will also drop it but at the same time construct its own repair next hop. This process continues until the repair path is established at which point the acknowledgement will be sent.

According to a second manner of reducing the SPF calculation overhead, incremental SPF's can be implemented as will be well known to the skilled reader and hence not described in detail here. In particular each node performs for the repair topology only up to the point where all of the addresses previously reached by the failed component are re-attached as a result of which a significantly less expensive algorithm is applied.

It will further be seen that the method described herein can be implemented in relation to alternative routing protocols or forwarding paradigms, and that the notvia address can be computed in any appropriate manner.

One such paradigm is MPLS (Multi Protocol Label Switching). MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent routers in the path together with headers or "labels" are pre-pended to the packet. The labels are used to direct the packet to the correct interface and next hop. The labels precede the IP or other header allowing smaller outer headers.

It will be further seen that the method described can be implemented across a network in which all routers are enabled to compute notvia addresses and hence acting as participating nodes, in which only a subsection of routers are enabled or in which some routers are partially enabled. In the case that all routers are enabled and have repair address capability then clearly the method can be implemented very simply as described above. In the case that some routers are enabled and others are not then, when calculating notvia paths, non-enabled nodes are removed from the base topology.[IMCS41] As a result no routes to a notvia address will ever be calculated that would attempt to traverse a non-enabled node such that non-enabled nodes will not receive notvia addresses which they are not equipped to deal with. It is possible that routers will be partially enabled, for example such that they are able to derive repair paths themselves and hence receive and forward packets to notvia addresses correctly but not themselves act as neighbour routers carrying out the encapsulation and forwarding steps as described above. In that case partially enabled routers can be included in the repair topology but will not themselves be able to instigate repairs.

The methods described above can be applied in nodes or routers performing fast re-route in any Internet protocol network for example by service providers deploying fast re-route in their call network.

The manner in which the method described herein is implemented in which software, firmware, hardware or any combination thereof and with any appropriate code changes as will be apparent to the skilled reader without the need for detailed description herein. For example extensions to the communication protocols such as the interior gateway protocol (IGP) may require extensions. In particular each enabled router that is directly connected to a protected network component will advertise a notvia address for that component in such a way that the association between the protected component and the notvia address can be determined by the other routers in the network as described above. Furthermore, enabled routers may advertise their capability for calculating and implementing notvia routes in the IGP together with the type of encapsulation that they support, for example IP in IP, GRE, L2TPv3 all of which will be well known to the skilled reader.

The addresses assigned as notvia addresses can be any appropriate addresses for example taken from a private address space for the network.

Any appropriate encapsulation may be used to carry a notvia repair, for example IP in IP, GRE or L2TPv3. Similarly any alternate encapsulation scheme can be adopted as long as the encapsulating router and the router to which the encapsulated packet is addressed as repair point have a common ability to process the chosen encapsulation type.

As a result of the approaches described above, a simple procedure is applied according to which only a single level of encapsulation is required and which, because all nodes effectively compute shortest repair paths, it provides shortest repair paths for any failure. Furthermore it will be seen that decapsulated packets may "backtrack" that is, be forwarded to one or more nodes from which it has arrived via the tunnel but still be forwarded using normal forwarding, without looping towards the destination because the repair point is closer to the destination.

It will also be seen that the approach described herein inherently compensates for single points of failure, that is, where a node comprises the only attachment point for a further node. In that case, where the attachment point is within the SRLG rather than at its far side, the approach described herein inherently ensures that packets will reach the attachment point node.

In addition any appropriate manner can be implemented for identifying SRLG's. For example when advertising its notvia address a node may signal that the non-available component is a member of an SRLG and identify the SRLG by any appropriate identifier or by identifying the other components in the SRLG. Alternatively each node may maintain its own record of SRLG's and cross-check prior to computing notvia addresses to establish whether any non-available components for which it is computing notvia addresses belong to one or more SRLG's.

4.0 Implementation Mechanisms—Hardware Overview

Figure 17:
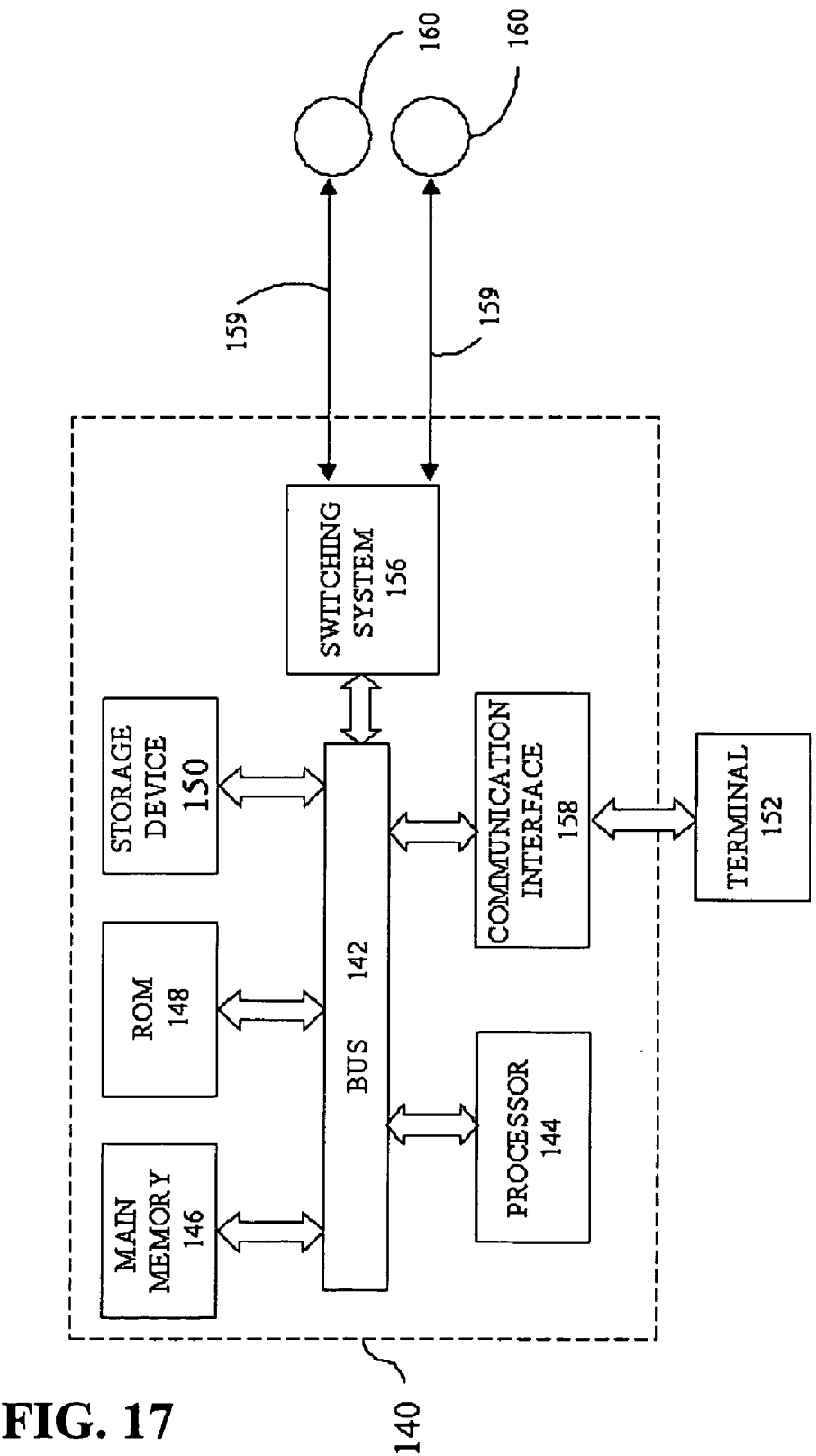
FIG. 17 is a block diagram that illustrates a computer system upon which a method for constructing a repair path may be implemented.

FIG. 17 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a participating node, repairing node or notifying node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

Furthermore, although report paths are pre-computed in the discussion above, alternatively they can be computed "on-the-fly".

In addition, although the approaches described above all relate to implementation using notvia addresses, other fast re-route techniques can be implemented whereby one or more SRLG's are accommodated. For example in cases where a repairing node computes its repair path to a neighbour component of a failed component using a distance vector, MPLS or discovery technique, it is still necessary to compute the repair path as though all SRLG's of which the failed component is a member have failed.

What is claimed is:

1. A method of constructing a repair path around a non-available component in a data communications network having, as components, nodes and links therebetween defining a network topology, the non-available component being a member of a shared risk group of components commonly renderable non-available, the method comprising the steps, performed at a repairing node, of:
   receiving a notvia network address of a repair target, the repair target being a neighbor component of the non-available component;
   constructing a repair network topology omitting all members of the shared risk group; and
   constructing a repair path to the notvia address of the repair target in the repair topology;
   wherein each node in the repair path constructs a repair path to the notvia address of the repair target in a repair topology omitting all members of the shared risk group;
   wherein the method is performed by a computing device.

2. A method as claimed in claim 1 further comprising:
   receiving, at the repairing node, data traffic for a destination reachable via the non-available component and the repair target;
   identifying non-availability of the non-available component; and
   sending said data traffic via the constructed repair path.

3. A method as claimed in claim 1, wherein said repair path is constructed for use in the event of non availability of the shared risk group of components.

4. A method as claimed in claim 3, wherein the repair path is constructed from at least each node in the repair path.

5. A method as claimed in claim 1 in which the repairing node comprises a neighbour node of the non-available component.

6. A method as claimed in claim 1 in which the non-available component is a member of a shared risk link group.

7. A method as claimed in claim 1 in which the non-available component comprises a node and the shared risk group comprises links attached to said node.

8. A method as claimed in claim 1 in which, where the non-available component is a member of multiple shared risk groups, the repair network omits the components of all of the shared risk groups.

9. A method as claimed in claim 1 in further comprising the step of identifying whether the non-available component is a node or a link and forwarding via a repair path accordingly.

10. A method as claimed in claim 1 further comprising identifying whether the shared risk group has commonly failed and, if not, forwarding via a repair path constructed for a repair network topology omitting only the non-available component.

11. A non-transitory computer-readable medium comprising one or more sequences of instructions which, when executed by one or more processors, cause the one or more processors to perform the steps of a method for constructing a repair path around a non-available component in a data communications network having, as components, nodes and links therebetween defining a network topology, the non-available component being a member of a shared risk group of components commonly renderable non-available, the method comprising the steps of:
   receiving a notvia network address of a repair target the repair target being a neighbor component of the non-available component;
   constructing a repair network topology omitting all members of the shared risk group; and
   constructing a repair path to the notvia address of the repair target in the repair topology;
   wherein each node in the repair path constructs a repair path to the notvia address of the repair target in a repair topology omitting all members of the shared risk group.

12. An apparatus for constructing a repair path around a non-available component in a data communications network having, as components, nodes and links therebetween defining a network topology, the non-available component being a member of a shared risk group of components commonly renderable non-available, the apparatus comprising:
   one or more processors; and
   a network interface communicatively coupled to the one or more processors and configured to communicate one or more packet flows among the one or more processors in a network; and
   a non-transitory computer-readable medium comprising one or more sequences of instructions which, when executed by the one or more processors, cause the one or more processors to perform the steps of:
      receiving a notvia network address of a repair target, the repair target being a neighbor component of the non-available component;
      constructing a repair network topology omitting all members of the shared risk group; and
      constructing a repair path to the notvia address of the repair target in the repair topology;
      wherein each node in the repair path constructs a repair path to the notvia address of the repair target in a repair topology omitting all members of the shared risk group.

13. An apparatus as claimed in claim 12 wherein the non-transitory computer-readable medium further comprises instructions for receiving, at the repairing node, data traffic for a destination reachable via the non-available component and the repair target, identifying non-availability of the non-available component and sending said data traffic via the constructed repair path.

14. An apparatus as claimed in claim 12, wherein said repair path is constructed for use in the event of non availability of the shared risk group of components.

15. An apparatus as claimed in claim 14 wherein the repair path is constructed from at least each node in the repair path.

16. An apparatus as claimed in claim 12 wherein the repairing node comprises a neighbour node of the non-available component.

17. An apparatus as claimed in claim 12 in which the non-available component is a member of a shared risk link group.

18. An apparatus as claimed in claim 12 in which the non-available component comprises a node and the shared risk group comprises links attached to said node.

19. An apparatus as claimed in claim 12 wherein the non-transitory computer-readable medium further comprises instructions for causing the repair network to omit, when the non-available component is a member of multiple shared risk groups, the components of all of the shared risk groups.

20. An apparatus as claimed in claim 12 wherein the non-transitory computer-readable medium further comprises instructions for identifying whether the non-available component is a node or a link and forwarding via a repair path accordingly.

21. An apparatus as claimed in claim 12 wherein the non-transitory computer-readable medium further comprises instructions for identifying whether the shared risk group has commonly failed and, if not, forwarding via a repair path constructed for a repair network topology omitting only the non-available component.

22. An apparatus for constructing a repair path around a non-available component in a data communications network having, as components, nodes and links therebetween defining a network topology, the non-available component being a member of a shared risk group of components commonly renderable non-available, the apparatus comprising:
  means for receiving a notvia network address of a repair target, the repair target being a neighbor component of the non-available component;
  means for constructing a repair network topology omitting all members of the shared risk group; and
  means for constructing a repair path to the notvia address of the repair target in the repair topology;
  wherein each node in the repair path includes means for constructing a repair path to the notvia address of the repair target in a repair topology omitting all members of the shared risk group.

23. An apparatus as claimed in claim 22 further comprising means for receiving, at the repairing node, data traffic for a destination reachable via the non-available component and the repair target, means for identifying non-availability of the non-available component and means for sending said data traffic via the constructed repair path.

24. An apparatus as claimed in claim 22, wherein said repair path is constructed for use in the event of non-availability of the shared risk group of components.

25. An apparatus as claimed in claim 24 wherein the repair path is constructed from at least each node in the repair path.

26. An apparatus as claimed in claim 22 further comprising means for identifying whether the non-available component is a node or a link and for forwarding via a repair path accordingly.

27. An apparatus as claimed in claim 22 further comprising means for identifying whether the shared risk group has commonly failed and, if not, forwarding via a repair path constructed for a repair network topology omitting only the non-available component.

28. A network packet routing apparatus configured for constructing a repair path around a shared risk link group of links in a data communication network, comprising:
  one or more processors; and
  a network interface communicatively coupled to the one or more processors and configured to communicate one or more packet flows among the one or more processors in a network; and
  a non-transitory computer-readable medium comprising one or more sequences of instructions which, when executed by the one or more processors, cause the one or more processors to perform the steps of:
  receiving a notvia network address of a network node;
  identifying, as a repair target, the network node, wherein the network node is a neighbor in a routing topology of a non-available network node;
  creating and storing a repair network topology omitting all members of the shared risk link group;
  creating and storing a repair path to the notvia address of the network node in the repair topology;
  wherein each node in the repair path constructs a repair path to the notvia address of the network node in a repair topology omitting all members of the shared risk link group.

29. An apparatus as recited in claim 28, wherein the non-transitory computer-readable medium further comprises instructions for performing the steps of:
  identifying a failed network component;
  determining whether the failed network component is a node or a link;
  when the failed network component is a node, performing a node repair step using a precomputed path;
  when the failed network component is a link, determining whether a link or the shared risk link group has failed, and performing a repair using the precomputed repair path.

30. A network packet routing apparatus configured for constructing a repair path around a shared risk link group of links in a data communication network, comprising:
  one or more processors; and
  a network interface communicatively coupled to the one or more processors and configured to communicate one or more packet flows among the one or more processors in a network; and
  a non-transitory computer-readable medium comprising one or more sequences of instructions which, when executed by the one or more processors, cause the one or more processors to perform the steps of:
  receiving, at a first network node, a notvia network address for a second network node;
  determining that a network link joining the first network node and the second network node is a member of a shared risk link group;
  determining that the second network node is a repair target node;
  creating and storing a repair topology in which all links in the shared risk link group are deemed failed;
  determining a nexthop node along a repair path in the repair topology;
  receiving one or more data packets that require repairing;
  encapsulating the data packets to the notvia address for the second network node; and
  forwarding the encapsulated data packets to the nexthop node;
  wherein each node in the repair path determines a nexthop node along a repair path in a repair topology in which all links in the shared risk link group are deemed failed.

31. An apparatus as recited in claim 30, wherein the non-transitory computer-readable medium further comprises instructions for performing the steps of:
  identifying a failed network component;
  determining whether the failed network component is a node or a link;
  when the failed network component is a node, performing a node repair step using a precomputed path;
  when the failed network component is a link, determining whether a link or the shared risk link group has failed, and performing a repair using the precomputed repair path.

* * * * *